(12) United States Patent
Zhou et al.

(10) Patent No.: US 12,142,234 B2
(45) Date of Patent: Nov. 12, 2024

(54) ELECTRONIC INK SCREEN AND CONTROL METHOD THEREFOR AND CONTROL DEVICE THEREFOR

(71) Applicant: HKC CORPORATION LIMITED, Shenzhen (CN)

(72) Inventors: Mancheng Zhou, Shenzhen (CN); Hao Tang, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/751,255

(22) Filed: Jun. 23, 2024

(65) Prior Publication Data

US 2024/0347015 A1 Oct. 17, 2024

Related U.S. Application Data

(63) Continuation of application No. PCT/CN2022/143541, filed on Dec. 29, 2022.

(30) Foreign Application Priority Data

Aug. 29, 2022 (CN) .......................... 202211041269.5

(51) Int. Cl.
*G09G 3/34* (2006.01)
*G02F 1/167* (2019.01)
(Continued)

(52) U.S. Cl.
CPC ............ *G09G 3/344* (2013.01); *G02F 1/167* (2013.01); *G02F 1/16757* (2019.01);
(Continued)

(58) Field of Classification Search
CPC ............ G09G 3/344; G09G 2320/0257; G09G 2340/0435; G09G 3/2003; G09G 3/2011;
(Continued)

(56) References Cited

U.S. PATENT DOCUMENTS 5,446,483 A 8/1995 Duley
9,984,608 B2 * 5/2018 Sacchetto ................ G09G 3/20
(Continued)

FOREIGN PATENT DOCUMENTS

CN 101800033 A 8/2010
CN 105070254 A 11/2015
(Continued)

OTHER PUBLICATIONS

Chinese First Office Action, Chinese Application No. 202211041269. 5, mailed Oct. 12, 2022 (12 pages).
(Continued)

*Primary Examiner* — Douglas M Wilson

(57) ABSTRACT

An electronic ink screen and a control method therefor and a control device therefor. The control method for the electronic ink screen includes: in a preset time period, ensuring that a difference between the number of times of positive voltage refresh processes corresponding to a target capsule and the number of times of negative voltage refresh processes corresponding to the target capsule is less than or equal to a preset difference threshold. Each of the positive voltage refresh processes includes: increasing an amplitude of a control voltage signal to a preset maximum positive voltage value, and then reducing the amplitude of the control voltage signal. Each of the negative voltage refresh processes includes: reducing the amplitude of the control voltage signal to a preset maximum negative voltage value, and then increasing the amplitude of the control voltage signal.

20 Claims, 3 Drawing Sheets

(51) Int. Cl.
  *G02F 1/16757* (2019.01)
  *G02F 1/1685* (2019.01)
  *G09G 3/20* (2006.01)

(52) U.S. Cl.
  CPC .......... *G02F 1/1685* (2019.01); *G09G 3/2011* (2013.01); *G09G 2320/0257* (2013.01); *G09G 2340/0435* (2013.01)

(58) Field of Classification Search
  CPC .... G02F 1/167; G02F 1/16757; G02F 1/1685; G02F 2203/34
  See application file for complete search history.

(56) References Cited

U.S. PATENT DOCUMENTS

| | | | |
|---|---|---|---|
| 2008/0303780 A1 | 12/2008 | Sprague et al. | |
| 2009/0267970 A1 | 10/2009 | Wong et al. | |
| 2020/0183078 A1 | 6/2020 | Wu et al. | |

FOREIGN PATENT DOCUMENTS

| | | |
|---|---|---|
| CN | 105632417 A | 6/2016 |
| CN | 107068071 A | 8/2017 |
| CN | 108847190 A | 11/2018 |
| CN | 111508440 A | 8/2020 |
| CN | 113380201 A | 9/2021 |
| CN | 113593466 A | 11/2021 |
| CN | 113870801 A * | 12/2021 |
| CN | 113917758 A | 1/2022 |
| CN | 114023272 A | 2/2022 |
| CN | 114446252 A | 5/2022 |
| CN | 114527611 A | 5/2022 |
| CN | 114724521 A | 7/2022 |
| CN | 115116403 A | 9/2022 |
| JP | 2003337352 A | 11/2003 |
| JP | 2009116041 A | 5/2009 |
| JP | 2009236603 A | 10/2009 |
| JP | 2010231215 A | 10/2010 |
| KR | 20070121403 A | 12/2007 |
| TW | 201131541 A | 9/2011 |
| WO | 2018120546 A1 | 7/2018 |
| WO | 2022082555 A1 | 4/2022 |

OTHER PUBLICATIONS

Chinese Notification to Grant Patent Right for Invention, Chinese Application No. 202211041269.5, mailed Oct. 21, 2022 (6 pages).
International Search Report, International Application No. PCT/CN2022/143541, mailed May 16, 2023 (14 pages).

* cited by examiner

US 12,142,234 B2

ELECTRONIC INK SCREEN AND CONTROL METHOD THEREFOR AND CONTROL DEVICE THEREFOR

CROSS-REFERENCE TO RELATED APPLICATIONS

The present application is a continuation of International Patent Application No. PCT/CN2022/143541, filed Dec. 29, 2022, which claims priority to Chinese Patent Application No. 202211041269.5, filed Aug. 29, 2022, both of which are herein incorporated by reference in their entirety.

TECHNICAL FIELD

The present disclosure relates to the technical field of display, and in particular to an electronic ink screen, a control method for the electronic ink screen, a control device for the electronic ink screen, and a computer-readable storage media.

BACKGROUND

With the development of the times, people's demand for reading is increasing. In order to improve the convenience of reading and protect the eyesight of readers, an electronic ink screen that may be configured to store a large amount of book data without easily damaging the eyesight of the readers has emerged. Each electronic ink capsule in the electronic ink screen typically stores first color particles with positive charges (such as white particles) and second color particles with negative charges (such as black particles). Thus, a color displayed by the electronic ink capsule may be controlled by applying different voltages (such as a positive voltage or a negative voltage) to the electronic ink capsule.

A drawback of the existing technology is that in response to the electronic ink capsule displaying the same color or similar color for a long time, it is easy to apply the positive voltage or the negative voltage to the electronic ink capsule for a long time. In this case, the electronic ink capsule is prone to irreversible damage, which leads to more serious ghosting in the electronic ink screen, resulting in poor display effect of the electronic ink screen.

SUMMARY OF THE DISCLOSURE

A first technical solution adopted in the present disclosure is providing a control method for an electronic ink screen. The electronic ink screen includes a plurality of electronic ink capsules, each of the plurality of electronic ink capsules includes first color particles with positive charges and second color particles with negative charges, an amplitude range of a control voltage signal corresponding to the plurality of electronic ink capsules is from a preset maximum negative voltage value to a preset maximum positive voltage value, and one of the plurality of electronic ink capsules is used as a target capsule. The control method includes: ensuring that a difference between the number of times of positive voltage refresh processes corresponding to the target capsule and the number of times of negative voltage refresh processes corresponding to the target capsule in a preset time period is less than or equal to a preset difference threshold. Each of the positive voltage refresh processes includes: increasing an amplitude of the control voltage signal to the preset maximum positive voltage value, and then reducing the amplitude of the control voltage signal, so that the target capsule displays a color based on the control voltage signal to complete a refresh of one frame. Each of the negative voltage refresh processes includes: reducing the amplitude of the control voltage signal to the preset maximum negative voltage value, and then increasing the amplitude of the control voltage signal, so that the target capsule displays the color based on the control voltage signal to complete the refresh of one frame.

In some embodiments, the ensuring that a difference between the number of times of positive voltage refresh processes corresponding to the target capsule and the number of times of negative voltage refresh processes corresponding to the target capsule in a preset time period is less than or equal to a preset difference threshold, includes: ensuring that the number of times of the positive voltage refresh processes corresponding to the target capsule is equal to the number of times of the negative voltage refresh processes corresponding to the target capsule in the preset time period.

In some embodiments, the preset time period is a time period corresponding to two frames, and one frame of the two frames is defined as a first frame and the other frame of the two frames is defined as a second frame. The ensuring that a difference between the number of times of positive voltage refresh processes corresponding to the target capsule and the number of times of negative voltage refresh processes corresponding to the target capsule in a preset time period is less than or equal to a preset difference threshold, includes: in a time period corresponding to the first frame, increasing the amplitude of the control voltage signal to the preset maximum positive voltage value, and then reducing the amplitude of the control voltage signal, so that the target capsule displays the color based on the control voltage signal to complete the refresh of the first frame; and in a time period corresponding to the second frame, reducing the amplitude of the control voltage signal to the preset maximum negative voltage value, and then increasing the amplitude of the control voltage signal, so that the target capsule displays the color based on the control voltage signal to complete the refresh of the second frame. Alternatively, the ensuring that a difference between the number of times of positive voltage refresh processes corresponding to the target capsule and the number of times of negative voltage refresh processes corresponding to the target capsule in a preset time period is less than or equal to a preset difference threshold, includes: in the time period corresponding to the first frame, reducing the amplitude of the control voltage signal to the preset maximum negative voltage value, and then increasing the amplitude of the control voltage signal, so that the target capsule displays the color based on the control voltage signal to complete the refresh of the first frame; and in the time period corresponding to the second frame, increasing the amplitude of the control voltage signal to the preset maximum positive voltage value, and then reducing the amplitude of the control voltage signal, so that the target capsule displays the color based on the control voltage signal to complete the refresh of the second frame.

In some embodiments, the preset time period includes a first time period and a second time period, and a difference between a duration of the first time period and a duration of the second time period is less than or equal to a preset time difference threshold. The ensuring that a difference between the number of times of positive voltage refresh processes corresponding to the target capsule and the number of times of negative voltage refresh processes corresponding to the target capsule in a preset time period is less than or equal to a preset difference threshold, includes: controlling the target capsule to display the color of each frame based on the positive voltage refresh process in the first time period, and controlling the target capsule to display the color of each frame based on the negative voltage refresh process in the second time period.

In some embodiments, the number of frames in the first time period is equal to the number of frames in the second time period, and the number of frames in the first time period or the number of frames in the second time period is greater than one.

In some embodiments, a duration of a time period corresponding to each frame in the preset time period is the same.

In some embodiments, the preset time period includes a first time period and a second time period, the number of frames in a time period corresponding to the first time period is equal to the number of frames in a time period corresponding to the second time period, and the time period corresponding to the first time period is in the time period corresponding to the second time period. The ensuring that a difference between the number of times of positive voltage refresh processes corresponding to the target capsule and the number of times of negative voltage refresh processes corresponding to the target capsule in a preset time period is less than or equal to a preset difference threshold, includes: determining the number of times that the positive voltage refresh process needs to be executed in the second time period based on the number of times that the negative voltage refresh process is executed in the first time period, and recording the number of times that the positive voltage refresh process needs to be executed in the second time period as a positive voltage number of times; and determining the number of times that the negative voltage refresh process needs to be executed in the second time period based on the number of times that the positive voltage refresh process is executed in the first time period, and recording the number of times that the negative voltage refresh process needs to be executed in the second time period as a negative voltage number of times. In the second time period, the positive voltage refresh process of the positive voltage number of times is executed, and the negative voltage refresh process of the negative voltage number of times is executed.

In some embodiments, the ensuring that a difference between the number of times of positive voltage refresh processes corresponding to the target capsule and the number of times of negative voltage refresh processes corresponding to the target capsule in a preset time period is less than or equal to a preset difference threshold, further includes: in the first time period, determining a value closest to the current amplitude of the control voltage signal in the preset maximum negative voltage value and the preset maximum positive voltage value in response to the target capsule displaying the color based on the control voltage signal to complete the refresh of one frame, wherein the negative voltage refresh process is executed in response to the closest value being the preset maximum negative voltage value, and the positive voltage refresh process is executed in response to the closest value being the preset maximum positive voltage value, so as to complete the refresh of a next frame.

In some embodiments, in the second time period, executing the positive voltage refresh process of the positive voltage number of times, and executing the negative voltage refresh process of the negative voltage number of times, includes: in the second time period, determining a value closest to the current amplitude of the control voltage signal in the preset maximum negative voltage value and the preset maximum positive voltage value in response to the target capsule displaying the color based on the control voltage signal to complete the refresh of one frame, wherein the negative voltage refresh process is executed in response to the closest value being the preset maximum negative voltage value, and the positive voltage refresh process is executed in response to the closest value being the preset maximum positive voltage value, so as to complete the refresh of the next frame, until the number of times that the positive voltage refresh process is executed reaches the positive voltage number of times in the second time period, or the number of times that the negative voltage refresh process is executed reaches the negative voltage number of times in the second time period.

In some embodiments, in the second time period, executing the positive voltage refresh process of the positive voltage number of times, and executing the negative voltage refresh process of the negative voltage number of times, further includes: controlling the target capsule to complete refresh of each frame that has not been refreshed in the second time period based on the negative voltage refresh process in response to the number of times that the positive voltage refresh process in the second time period is executed reaching the positive voltage number of times, and controlling the target capsule to complete the refresh of each frame that has not been refreshed in the second time period based on the positive voltage refresh process in response to the number of times that the negative voltage refresh process is executed in the second time period reaching the negative voltage number of times.

In some embodiments, the first color particles are white particles, and the second color particles are black particles; or the first color particles are black particles, and the second color particles are white particles.

In some embodiments, a ratio of the preset difference threshold to the number of times of the positive voltage refresh processes in the preset time period is recorded as a first ratio, and/or a ratio of the preset difference threshold to the number of times of the negative voltage refresh processes in the preset time period is recorded as a second ratio; and the first ratio is less than or equal to a preset ratio threshold, and/or, the second ratio is less than or equal to the preset ratio threshold.

In some embodiments, a duration of the preset time period is less than or equal to a duration corresponding to preset quantity of frames.

In some embodiments, preset quantity is negatively correlated with a usage duration of the target capsule.

In some embodiments, a usage duration of a capsule with the longest usage duration in the plurality of electronic ink capsules is recorded as a target usage duration; and the preset quantity is negatively correlated with the target usage duration.

A second technical solution adopted in the present disclosure is providing a control device for an electronic ink screen. The electronic ink screen includes a plurality of electronic ink capsules, each of the plurality of the electronic ink capsules includes first color particles with positive charges and second color particles with negative charges, an amplitude range of a control voltage signal corresponding to the plurality of electronic ink capsules is from a preset maximum negative voltage value to a preset maximum positive voltage value, and one of the plurality of electronic ink capsules is used as a target capsule. The control device includes: a control unit, configured to ensure that a difference between the number of times of positive voltage refresh processes corresponding to the target capsule and the number of times of negative voltage refresh processes corresponding to the target capsule in a preset time period is less than or equal to a preset difference threshold. Each of the positive voltage refresh processes includes: increasing an amplitude of the control voltage signal to the preset maximum positive voltage value, and then reducing the amplitude of the control voltage signal, so that the target capsule displays a color based on the control voltage signal, so as to complete refresh of one frame. Each of the negative voltage refresh processes includes: reducing the amplitude of the control voltage signal to the preset maximum negative voltage value, and then increasing the amplitude of the control voltage signal, so that the target capsule displays the color based on the control voltage signal, so as to complete the refresh of one frame.

In some embodiments, the control unit is configured for: ensuring that the number of times of the positive voltage refresh processes corresponding to the target capsule is equal to the number of times of the negative voltage refresh processes corresponding to the target capsule in the preset time period.

In some embodiments, the preset time period is a time period corresponding to two frames, and one frame of the two frames is defined as a first frame and the other frame of the two frames is defined as a second frame. The control unit is configured for: in a time period corresponding to the first frame, increasing the amplitude of the control voltage signal to the preset maximum positive voltage value, and then reducing the amplitude of the control voltage signal, so that the target capsule displays the color based on the control voltage signal to complete the refresh of the first frame; and in a time period corresponding to the second frame, reducing the amplitude of the control voltage signal to the preset maximum negative voltage value, and then increasing the amplitude of the control voltage signal, so that the target capsule displays the color based on the control voltage signal to complete the refresh of the second frame. Alternatively, the control unit is configured for: in the time period corresponding to the first frame, reducing the amplitude of the control voltage signal to the preset maximum negative voltage value, and then increasing the amplitude of the control voltage signal, so that the target capsule displays the color based on the control voltage signal to complete the refresh of the first frame; and in the time period corresponding to the second frame, increasing the amplitude of the control voltage signal to the preset maximum positive voltage value, and then reducing the amplitude of the control voltage signal, so that the target capsule displays the color based on the control voltage signal to complete the refresh of the second frame.

In some embodiments, the preset time period includes a first time period and a second time period, and a difference between a duration of the first time period and a duration of the second time period is less than or equal to a preset time difference threshold. The control unit is configured for: controlling the target capsule to display the color of each frame based on the positive voltage refresh process in the first time period, and controlling the target capsule to display the color of each frame based on the negative voltage refresh process in the second time period.

A third technical solution adopted in the present disclosure is providing an electronic ink screen. The electronic ink screen includes a memory, a processor, and a plurality of electronic ink capsules. The memory is configured to store a program instruction. The processor is configured to execute the program instruction to implement the above methods. Each of the plurality of electronic ink capsules includes first color particles with positive charges and second color particles with negative charges, an amplitude range of a control voltage signal corresponding to the plurality of electronic ink capsules is from a preset maximum negative voltage value to a preset maximum positive voltage value, and one of the plurality of electronic ink capsules is used as a target capsule.

DETAILED DESCRIPTION

The present disclosure may be explained in detail by combining the accompanying drawings and embodiments. It should be noted that the following embodiments are only used to illustrate the present disclosure, but do not limit the scope of the present disclosure. Similarly, the following embodiments are only a part of the embodiments of the present disclosure, and not all embodiments. All other embodiments obtained by those of ordinary skill in the art without creative effort are within the scope of the present disclosure.

The reference to "embodiment" in the present disclosure means that, specific features, structures, or characteristics described in conjunction with an embodiment may be included in at least one embodiment of the present disclosure. The phrase appearing in various positions in the specification does not necessarily refer to the same embodiment, nor is it an independent or alternative embodiment that is mutually exclusive with other embodiments. Those of ordinary skill in the art explicitly and implicitly understand that the embodiments described in the present disclosure may be combined with other embodiments.

In the description of the present disclosure, it should be noted that unless otherwise expressly specified and limited, the terms "installation", "setting", and "connection" should be broadly understood. For example, it may be a fixed connection, a detachable connection, or an integrated connection; it may be a mechanical connection or an electrical connection; it may be a direct connection or an indirect connection through an intermediate medium. For those of ordinary skill in the art, the specific meanings of the above term may be understood according to specific circumstances.

The main technical problem in the present disclosure is how to reduce a ghosting phenomenon of an electronic ink screen, so as to improve a display effect of the electronic ink screen.

The present disclosure first provides a control method for an electronic ink screen, which is applied to the electronic ink screen.

Figure 6:
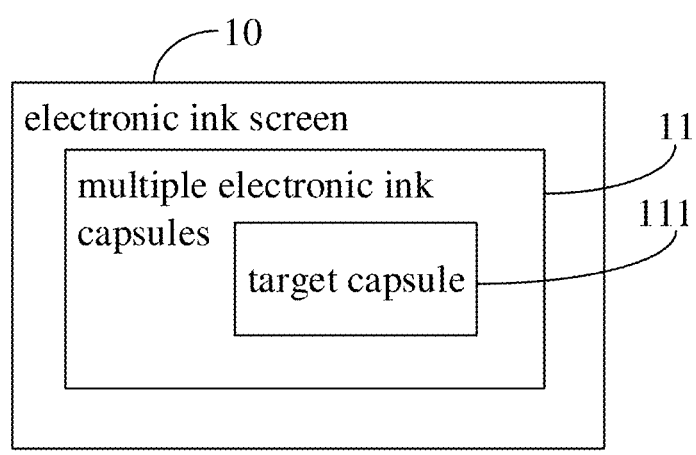
FIG. 6 is a structural schematic view of the electronic ink screen in an embodiment of the present disclosure.

The electronic ink screen may include multiple electronic ink capsules, the multiple electronic ink capsules may be arranged in an array on a substrate of the electronic ink screen or arranged in other ways. The specific arrangement of the multiple electronic ink capsules may be determined according to actual needs and is not limited here. FIG. 6 is a structural schematic view of the electronic ink screen in an embodiment of the present disclosure. As illustrated in FIG. 6, in an embodiment, a first electronic ink screen 10 includes multiple electronic ink capsules 11, and the multiple electronic ink capsules 11 include a target capsule 111.

A single electronic ink capsule includes first color particles with positive charges and second color particles with negative charges. For example, in a black and white electronic ink screen, the single electronic ink capsule may include white particles with positive charges and black particles with negative charges, or the single electronic ink capsule may include black particles with positive charges and white particles with negative charges. According to different colors to be displayed by the electronic ink screen, the color of the first color particles and the color of the second color particles may also be a combination of other colors, which may be determined according to actual needs and are not limited here.

By sending the corresponding control voltage signal to the electronic ink capsule, an electric field may be applied to the electronic ink capsule, so that the electronic ink capsule may display the corresponding color and complete the color display. An amplitude range of the control voltage signal is from a preset maximum negative voltage value to a preset maximum positive voltage value. In response to the amplitude of the control voltage signal corresponding to the electronic ink capsule being at different voltage values, the electronic ink capsule may display different colors based on different number of combinations of the first color particles and the second color particles under the action of the corresponding electric field on the electronic ink capsule.

One of the multiple electronic ink capsules may be used as a target capsule, and the control method for the electronic ink screen includes the following operations.

At the operation S11, the control method for the electronic ink screen may include ensuring that a difference between the number of times of positive voltage refresh processes corresponding to the target capsule and the number of times of negative voltage refresh processes corresponding to the target capsule in a preset time period is less than or equal to a preset difference threshold.

A positive voltage refresh process includes: increasing the amplitude of the control voltage signal to the preset maximum positive voltage value, and then reducing the amplitude of the control voltage signal, so that the target capsule displays a color based on the control voltage signal to complete a refresh of one frame.

A negative voltage refresh process includes: reducing the amplitude of the control voltage signal to the preset maximum negative voltage value, and then increasing the amplitude of the control voltage signal, so that the target capsule displays the color based on the control voltage signal to complete the refresh of one frame.

In some embodiments, a single positive voltage refresh process includes the following operations.

After the target capsule displays a frame of corresponding color, the amplitude of the control voltage signal received by the target capsule may be increased until the amplitude reaches the preset maximum positive voltage value. Then, the amplitude of the control voltage signal reaching the preset maximum positive voltage value may be reduced until the amplitude reaches a target voltage value corresponding to the target color, so that the target capsule may display the target color based on the control voltage signal of the target voltage value, completing the refresh of one frame corresponding to the target capsule. The target color is the color that the target capsule needs to display in the current frame.

Correspondingly, a single negative voltage refresh process includes the following operations.

After the target capsule displays a frame of corresponding color, the amplitude of the control voltage signal received by the target capsule may be reduced until the amplitude reaches the preset maximum negative voltage value. Then, the amplitude of the control voltage signal reaching the preset maximum negative voltage value may be increased until the amplitude reaches the target voltage value corresponding to the target color, so that the target capsule may display the target color based on the control voltage signal of the target voltage value, completing the refresh of one frame corresponding to the target capsule.

Figure 1:
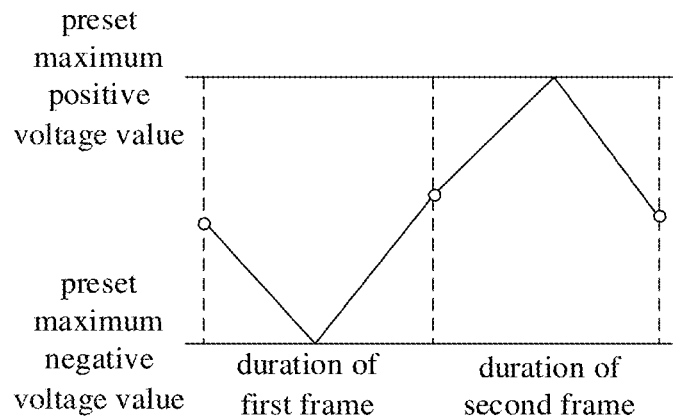
FIG. 1 is a waveform schematic view of a control voltage signal in an embodiment of the present disclosure.

In some embodiments, FIG. 1 is a waveform schematic view of a control voltage signal in an embodiment of the present disclosure. As illustrated in FIG. 1, a preset duration is assumed to be two frame durations, in a first frame duration of the two frame durations, after the target capsule completes one frame refresh, a negative voltage refresh process may be executed to complete one frame refresh. And then another frame refresh may be completed by executing a positive voltage refresh process, to ensure that in the two frame durations, the number of times that the target capsule receives the control voltage signal with the amplitude of the preset maximum negative voltage value is equal to the number of times that the target capsule receives the control voltage signal with the amplitude of the preset maximum positive voltage value.

Different from existing technologies, in the technical solutions of the present disclosure, the difference between the number of times of the positive voltage refresh processes corresponding to the target capsule and the number of times of the negative voltage refresh processes corresponding to the target capsule in the preset time period is less than or equal to the preset difference threshold. Thus, in the preset time period, the number of times of the positive voltage refresh processes corresponding to the target capsule is close to the number of times of the negative voltage refresh processes corresponding to the target capsule. Thus, in the preset time period, the number of times that the amplitude of the control voltage signal received by the target capsule reaches the maximum positive voltage value is close to the number of times that the amplitude of the control voltage signal received by the target capsule reaches the maximum negative voltage value. Thus, it may avoid the situation where the target capsule receives the positive voltage signal or the negative voltage signal for a long time, so as to reduce the possibility of damage to the electronic ink capsule of the electronic ink screen, thereby slowing down the occurrence of the ghosting phenomenon in the electronic ink screen and improving the display effect of the electronic ink screen.

In addition, compared with a method that the amplitude of the control voltage signal is directly adjusted from the target voltage value corresponding to one frame to the target voltage value corresponding to another frame, in the present disclosure, the amplitude of the control voltage signal is first adjusted to the preset maximum positive voltage value or the preset maximum negative voltage value. And then the preset maximum positive voltage value or the preset maximum negative voltage value is used as a reference to adjust the amplitude of the control voltage signal to the corresponding target voltage value. It may make the target voltage value obtained after adjusting the control voltage signal more accurate. That is, the color displayed by the target capsule may be more accurate, so that the ghosting phenomenon in the electronic ink screen may be further reduced, and the display effect of the electronic ink screen is further improved.

In some embodiments, the operation S11 may include the following operation: ensuring that the number of times of the positive voltage refresh processes corresponding to the target capsule is equal to the number of times of the negative voltage refresh processes corresponding to the target capsule in the preset time period.

Based on the above method, the number of times that the target capsule performs a corresponding frame color display operation based on the positive voltage refresh process is equal to the number of times that the target capsule performs a corresponding frame color display operation based on the negative voltage refresh process. That is, the number of times that the amplitude of the control voltage signal received by the target capsule reaches the maximum positive voltage value is exactly equal to the number of times that the amplitude of the control voltage signal received by the target capsule reaches the maximum negative voltage value in the preset time period. Thus, the target capsule is controlled by the positive voltage to the same extent as that by the negative voltage, thereby minimizing the possibility of damage to the target capsule and improving the reliability of the electronic ink screen.

In one embodiment, the preset time period is the time period corresponding to two adjacent frames, and one frame of the two frames is defined as a first frame and the other frame of the two frames is defined as a second frame.

In some embodiments, the operation S11 may include the following operations.

In a time period corresponding to the first frame, the amplitude of the control voltage signal is increased to the preset maximum positive voltage value, and then the amplitude of the control voltage signal is reduced, so that the target capsule displays the color based on the control voltage signal to complete the refresh of the first frame. In a time period corresponding to the second frame, the amplitude of the control voltage signal is reduced to the preset maximum negative voltage value, and then the amplitude of the control voltage signal is increased, so that the target capsule displays the color based on the control voltage signal to complete the refresh of the second frame.

Alternatively, in the time period corresponding to the first frame, the amplitude of the control voltage signal is reduced to the preset maximum negative voltage value, and then the amplitude of the control voltage signal is increased, so that the target capsule displays the color based on the control voltage signal to complete the refresh of the first frame. In the time period corresponding to the second frame, the amplitude of the control voltage signal is increased to the preset maximum positive voltage value, and then the amplitude of the control voltage signal is reduced, so that the target capsule displays the color based on the control voltage signal to complete the refresh of the second frame.

In some embodiments, in response to the preset time period including and only including the time period corresponding to the first frame and the time period corresponding to the second frame, the positive voltage refresh process may be executed in any one of these two time periods to complete the refresh of the corresponding frame, and the negative voltage refresh process may be executed in the other time period of these two time periods to complete the refresh of the corresponding frame. The time period for completing the positive voltage refresh process may be the time period corresponding to the first frame, or the time period corresponding to the second frame, which is not limited here.

Based on the above method, the target capsule may respectively execute one positive voltage refresh process and one negative voltage refresh process in the time periods corresponding to any two adjacent frames. That is, the target capsule respectively receives one positive voltage control voltage signal and one negative voltage control voltage signal in the time periods corresponding to any two adjacent frames. Thus, the target capsule may continuously maintain a state where the number of times that the amplitude of the received control voltage signal reaches the maximum positive voltage value is equal to the number of times that the amplitude of the received control voltage signal reaches the maximum negative voltage value. Alternatively, the target capsule may continuously maintain a state where the number of times that the amplitude of the received control voltage signal reaches the maximum positive voltage value differs by one from the number of times that the amplitude of the received control voltage signal reaches the maximum negative voltage value. Thus, the possibility of damage to the electronic ink capsule of the electronic ink screen is reduced and the display effect of the electronic ink screen is improved.

In an embodiment, the preset time period includes the first time period and the second time period, and a difference between a duration of the first time period and a duration of the second time period is less than or equal to a preset time difference threshold.

In some embodiments, the operation S11 may include the following operation: controlling the target capsule to display the color of each frame based on the positive voltage refresh process in the first time period, and controlling the target capsule to display the color of each frame based on the negative voltage refresh process in the second time period.

In some embodiments, in the time period corresponding to each frame in the first time period, the amplitude of the control voltage signal received by the target capsule is first increased to the preset maximum positive voltage value and then reduced to the target voltage value based on the positive voltage refresh process, so as to display the corresponding color. In the time period corresponding to each frame in the second time period, the amplitude of the control voltage signal received by the target capsule is first reduced to the preset maximum negative voltage value and then increased to the target voltage value based on the negative voltage refresh process, so as to display the corresponding color.

The duration of the time period corresponding to each frame in the preset time period is equal or close to each other. A difference between the duration corresponding to the first time period and the duration corresponding to the second time period is less than or equal to the preset time difference threshold. Thus, in the first time period, the number of times that the target capsule receives the positive voltage control voltage signal is close or equal to the number of times that the target capsule receives the negative voltage control voltage signal. Thus, the possibility of damage to the electronic ink capsule of the electronic ink screen is reduced, and the display effect of the electronic ink screen is improved.

In some embodiments, the number of frames in the first time period is equal to the number of frames in the second time period, and the number of frames in the first time period or the number of frames in the second time period is greater than one.

Based on the above method, in the first time period, the number of times that the target capsule receives the positive control voltage signal is equal to the number of times that the target capsule receives the negative control voltage signal, thereby minimizing the possibility of damage to the electronic ink capsule of the electronic ink screen and improving the display effect of the electronic ink screen.

In an embodiment, the preset time period includes the first time period and the second time period. The number of frames in the time period corresponding to the first time period is equal to the number of frames in the time period corresponding to the second time period. The time period corresponding to the first time period is in the time period corresponding to the second time period.

In some embodiments, the operation S11 may include the following operation: determining the number of times that the positive voltage refresh process needs to be executed in the second time period based on the number of times that the negative voltage refresh process is executed in the first time period, and recording the number of times that the positive voltage refresh process needs to be executed in the second time period as a positive voltage number of times; and determining the number of times that the negative voltage refresh process needs to be executed in the second time period based on the number of times that the positive voltage refresh process is executed in the first time period, and recording the number of times that the negative voltage refresh process needs to be executed in the second time period as a negative voltage number of times.

In the second time period, the positive voltage refresh process of the positive voltage number of times is executed, and the negative voltage refresh process of the negative voltage number of times is executed.

In some embodiments, in the second time period, according to the number of times that the target capsule respectively receives the positive voltage control voltage signal and the negative voltage control voltage signal in the first time period to complete the color display of one frame, the number of times that the target capsule needs to respectively receive the positive voltage control voltage signal and the negative voltage control voltage signal in the second time period to complete the color display of one frame may be determined, so as to reduce the possibility of damage to the electronic ink capsule of the electronic ink screen. By the above method, in the preset time period, the total number of times that the target capsule receives the positive voltage control voltage signal is equal to the total number of times that the target capsule receives the negative voltage control voltage signal, thereby reducing the ghosting phenomenon in the electronic ink screen and improving the display effect of the electronic ink screen.

In some embodiments, the operation S11 may further include the following operation: in the first time period, determining a value closest to the current amplitude of the control voltage signal in the preset maximum negative voltage value and the preset maximum positive voltage value in response to the target capsule displaying the color based on the control voltage signal to complete the refresh of one frame, wherein the negative voltage refresh process is executed in response to the closest value being the preset maximum negative voltage value, and the positive voltage refresh process is executed in response to the closest value being the preset maximum positive voltage value, so as to complete the refresh of the next frame.

In some embodiments, in the first time period, after the target capsule completes the refresh of one frame, according to the amplitude of the control voltage signal after the target capsule completes the refresh of this frame, a difference between the current amplitude and the preset maximum positive voltage value and a difference between the current amplitude and the preset maximum negative voltage value may be determined. In the difference between the current amplitude and the preset maximum positive voltage value and the difference between the current amplitude and the preset maximum negative voltage value, the minimum difference may be determined, and one of the preset maximum positive voltage value and the preset maximum negative voltage value corresponding to the minimum difference is determined as the value closest to the amplitude of the control voltage signal.

In response to the closest value being determined as the preset maximum positive voltage value, it may be considered that adjusting the amplitude of the current control voltage signal to the preset maximum positive voltage value is faster than adjusting the amplitude of the current control voltage signal to the preset maximum negative voltage value. Thus, in order to achieve the fastest signal amplitude, the positive voltage refresh process may be executed to complete the refresh of the next frame. Similarly, in response to the closest value being determined as the preset maximum negative voltage value, it may be considered that adjusting the amplitude of the current control voltage signal to the preset maximum negative voltage value is faster than adjusting the amplitude of the current control voltage signal to the preset maximum positive voltage value. Thus, in order to achieve the fastest signal amplitude, the negative voltage refresh process may be executed to complete the refresh of the next frame.

Based on the above method, the fastest refresh of the target capsule in the first time period may be performed. In the second time period, the number of times that the corresponding positive voltage refresh process and the negative voltage refresh process need to be executed may still be determined according to the number of times that the positive voltage refresh process and the negative voltage refresh process are executed in the first time period. It may ensure a balance between the number of times of the positive voltage refresh process corresponding to the target capsule and the number of times of the negative voltage refresh process corresponding to the target capsule. Thus, the ghosting phenomenon in the electronic ink screen is reduced and the display effect of the electronic ink screen is improved.

In some embodiments, in the second time period, executing the positive voltage refresh process of the positive voltage number of times, and executing the negative voltage refresh process of the negative voltage number of times may include the following operation: in the second time period, determining a value closest to the current amplitude of the control voltage signal in the preset maximum negative voltage value and the preset maximum positive voltage value in response to the target capsule displaying the color based on the control voltage signal to complete the refresh of one frame, wherein the negative voltage refresh process is executed in response to the closest value being the preset maximum negative voltage value, and the positive voltage refresh process is executed in response to the closest value being the preset maximum positive voltage value, so as to complete the refresh of the next frame, until the number of times that the positive voltage refresh process is executed reaches the positive voltage number of times in the second time period, or the number of times that the negative voltage refresh process is executed reaches the negative voltage number of times in the second time period.

In the second time period, in response to the number of times that the positive voltage refresh process in the second time period is executed reaching the positive voltage number of times, the target capsule is controlled to complete the refresh of each frame that has not been refreshed in the second time period based on the negative voltage refresh process. In response to the number of times that the negative voltage refresh process is executed in the second time period reaching the negative voltage number of times, the target capsule is controlled to complete the refresh of each frame that has not been refreshed in the second time period based on the positive voltage refresh process.

Based on the above method, it may further maximize the refresh speed corresponding to some frames in the second time period, and ensure the balance between the number of times of the positive voltage refresh process corresponding to the target capsule and the number of times of the negative voltage refresh process corresponding to the target capsule. Thus, the ghosting phenomenon in the electronic ink screen is reduced and the display effect of the electronic ink screen is improved.

In one embodiment, a ratio of the preset difference threshold to the number of times of the positive voltage refresh processes in the preset time period is recorded as a first ratio, and/or a ratio of the preset difference threshold to the number of times of the negative voltage refresh processes in the preset time period is recorded as a second ratio.

The first ratio is less than or equal to a preset ratio threshold, and/or, the second ratio is less than or equal to the preset ratio threshold.

In some embodiments, for example, the preset ratio threshold is assumed to be 0.1, in response to the number of times of the positive voltage refresh processes in the preset time period being 10 times, the first ratio less than or equal to 0.1 means that the preset difference threshold is less than or equal to 1 time. Similarly, in response to the number of times of the negative voltage refresh processes in the preset time period being 20 times, the second ratio less than or equal to 0.1 means that the preset difference threshold is less than or equal to 2 times. The above values are only examples, and may be other values, which is not limited here.

Based on the above method, it may adaptively adjust the preset difference threshold according to the number of times of the positive voltage refresh processes and/or the number of times of the negative voltage refresh processes in the preset time period, avoiding the preset difference threshold being too large or too small relative to the number of times of the positive voltage refresh processes and/or the number of times of the negative voltage refresh processes in the preset time period. Therefore, the difference between the number of times of the positive voltage and the number of times of the negative voltage received by the electronic ink capsule in the preset time period is avoided to be too large, which further improves the reliability of the above methods for controlling the electronic ink screen and improves the display effect of the electronic ink screen.

In one embodiment, the duration of the preset time period is less than or equal to the duration corresponding to the preset quantity of frames.

Based on the above method, it may avoid the preset time period of too long, so as to avoid the damage caused by the target capsule receiving continuous positive voltage or negative voltage for too long in the preset time period.

In some embodiments, there is a negative correlation between the preset quantity and a usage duration of the target capsule.

In some embodiments, the longer the usage duration of the target capsule, the higher the possibility of damage to the target capsule due to receiving continuous positive voltage or negative voltage. Therefore, the preset quantity may be negatively correlated with the usage duration of the target capsule, which further reduces the possibility of damage to the target capsule and improve the display effect of the electronic ink screen.

In some embodiments, the usage duration of a capsule with the longest usage duration in the multiple electronic ink capsules is recorded as a target usage duration. There is a negative correlation between the preset quantity and the target usage duration.

In some embodiments, the maximum usage duration in the usage durations of the multiple electronic ink capsules, that is the target usage duration, may be configured to determine the preset quantity corresponding to all electronic ink capsules, which further reduces the possibility of damage to the target capsules and improves the display effect of the electronic ink screen.

Figure 2:
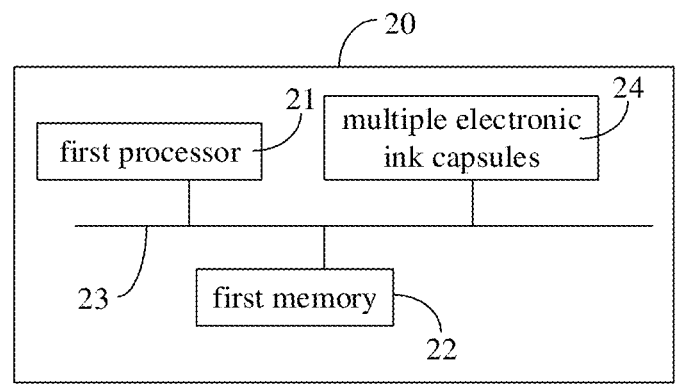
FIG. 2 is a structural schematic view of an electronic ink screen in an embodiment of the present disclosure.

The present disclosure further provides an electronic ink screen, as illustrated in FIG. 2, FIG. 2 is a structural schematic view of an electronic ink screen in an embodiment of the present disclosure. A second electronic ink screen 20 includes a first processor 21, a first memory 22, a first bus 23, and multiple electronic ink capsules 24. The multiple electronic ink capsules 24 may be the multiple electronic ink capsules as described in any one of above embodiments, which is not repeated here.

The first processor 21, the first memory 22, and the multiple electronic ink capsules 24 are respectively connected to the first bus 23. The first memory 22 stores a program instruction, and the first processor 21 is configured to execute the program instruction to implement the control method for the electronic ink screen in any one of the above embodiments.

In the present embodiment, the first processor 21 may also be referred to as a central processing unit (CPU). The first processor 21 may be an integrated circuit chip with a signal processing capability. The first processor 21 may also be a general-purpose processor, a digital signal processor (DSP), an application-specific integrated circuit (ASIC), a field programmable gate array (FPGA) or other programmable logic devices, discrete gates or transistor logic devices, or discrete hardware components. The general-purpose processor may be a microprocessor or the first processor 21 may also be any conventional processor, etc.

Different from the existing technologies, in the technical solutions of the present disclosure, the difference between the number of times of the positive voltage refresh processes corresponding to the target capsule and the number of times of the negative voltage refresh processes corresponding to the target capsule in the preset time period is less than or equal to the preset difference threshold. Thus, in the preset time period, the number of times of the positive voltage refresh processes corresponding to the target capsule is close to the number of times of the negative voltage refresh processes corresponding to the target capsule. Thus, in the preset time period, the number of times that the amplitude of the control voltage signal received by the target capsule reaches the maximum positive voltage value is close to the number of times that the amplitude of the control voltage signal received by the target capsule reaches the maximum negative voltage value. Thus, it may avoid the situation where the target capsule receives the positive voltage signal or the negative voltage signal for a long time, so as to reduce the possibility of damage to the electronic ink capsule of the electronic ink screen, thereby slowing down the occurrence of the ghosting phenomenon in the electronic ink screen and improving the display effect of the electronic ink screen.

Figure 3:
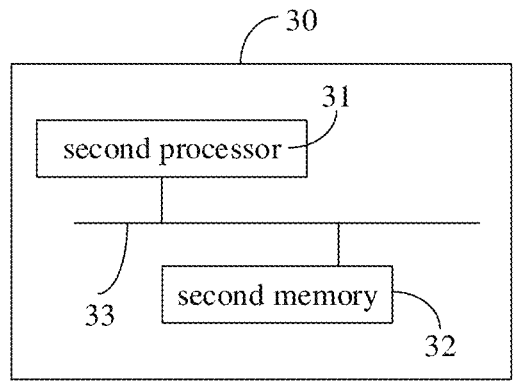
FIG. 3 is a structural schematic view of a control device for the electronic ink screen in an embodiment of the present disclosure.

The present disclosure further provides a control device for the electronic ink screen, which is applied to the electronic ink screen, as illustrated in FIG. 3, FIG. 3 is a structural schematic view of a control device for the electronic ink screen in an embodiment of the present disclosure. A third electronic ink screen 30 includes a second processor 31, a second memory 32, and a second bus 33. The electronic ink screen includes the multiple electronic ink capsules 11 as described in any one of above embodiments, which is not repeated here.

The second processor 31 and the second memory 32 are respectively connected to the second bus 33, the second memory 32 stores the program instruction. The second processor 31 is configured to execute the program instruction to implement the control method for the electronic ink screen in any one of the above embodiments.

In the present embodiment, the second processor 31 may also be referred to as the central processing unit (CPU). The second processor 31 may be the integrated circuit chip with the signal processing capability. The second processor 31 may also be the general-purpose processor, the digital signal processor (DSP), the application-specific integrated circuit (ASIC), the field programmable gate array (FPGA) or other programmable logic devices, discrete gates or transistor logic devices, or discrete hardware components. The general-purpose processor may be the microprocessor or the second processor 31 may also be any conventional processor, etc.

Different from the existing technologies, in the technical solutions of the present disclosure, the difference between the number of times of the positive voltage refresh processes corresponding to the target capsule and the number of times of the negative voltage refresh processes corresponding to the target capsule in the preset time period is less than or equal to the preset difference threshold. Thus, in the preset time period, the number of times of the positive voltage refresh processes corresponding to the target capsule is close to the number of times of the negative voltage refresh processes corresponding to the target capsule. Thus, in the preset time period, the number of times that the amplitude of the control voltage signal received by the target capsule reaches the maximum positive voltage value is close to the number of times that the amplitude of the control voltage signal received by the target capsule reaches the maximum negative voltage value. Thus, it may avoid the situation where the target capsule receives the positive voltage signal or the negative voltage signal for a long time, so as to reduce the possibility of damage to the electronic ink capsule of the electronic ink screen, thereby slowing down the occurrence of the ghosting phenomenon in the electronic ink screen and improving the display effect of the electronic ink screen.

Figure 4:
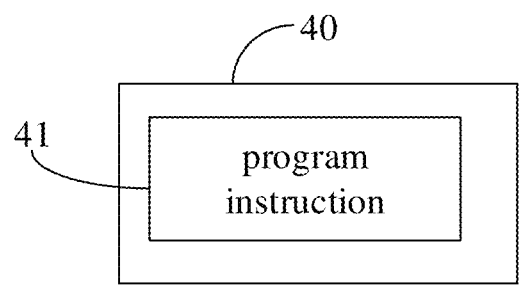
FIG. 4 is a structural schematic view of a computer-readable storage medium in an embodiment of the present disclosure.

The present disclosure further provides a computer-readable storage medium, as illustrated in FIG. 4, FIG. 4 is a structural schematic view of a computer-readable storage medium in an embodiment of the present disclosure. The computer-readable storage medium 40 stores a program instruction 41, and the control method for the electronic ink screen is implemented in response to the program instruction 41 being executed by the processor (not shown in FIG. 4).

In the present embodiment, the computer-readable storage medium 40 may be, but not limited to, a USB flash drive, a SD card, a PD optical drive, a mobile hard disk, a large capacity floppy drive, a flash memory, a multimedia memory card, or a server, etc.

Different from the existing technologies, in the technical solutions of the present disclosure, the difference between the number of times of the positive voltage refresh processes corresponding to the target capsule and the number of times of the negative voltage refresh processes corresponding to the target capsule in the preset time period is less than or equal to the preset difference threshold. Thus, in the preset time period, the number of times of the positive voltage refresh processes corresponding to the target capsule is close to the number of times of the negative voltage refresh processes corresponding to the target capsule. Thus, in the preset time period, the number of times that the amplitude of the control voltage signal received by the target capsule reaches the maximum positive voltage value is close to the number of times that the amplitude of the control voltage signal received by the target capsule reaches the maximum negative voltage value. Thus, it may avoid the situation where the target capsule receives the positive voltage signal or the negative voltage signal for a long time, so as to reduce the possibility of damage to the electronic ink capsule of the electronic ink screen, thereby slowing down the occurrence of the ghosting phenomenon in the electronic ink screen and improving the display effect of the electronic ink screen.

The present disclosure further provides a control device for the electronic ink screen. The electronic ink screen includes the multiple electronic ink capsules. The electronic ink capsules include the first color particles with the positive charges and the second color particles with the negative charges. The amplitude range of the control voltage signal corresponding to the electronic ink capsule is from the preset maximum negative voltage value to the preset maximum positive voltage value. One of the multiple electronic ink capsules is used as the target capsule.

Figure 5:
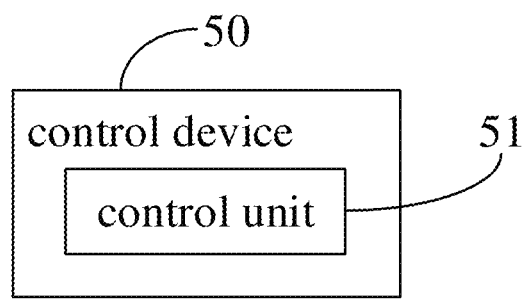
FIG. 5 is a structural schematic view of a control device for the electronic ink screen in an embodiment of the present disclosure.

As illustrated in FIG. 5, FIG. 5 is a structural schematic view of a control device for the electronic ink screen in an embodiment of the present disclosure. The control device 50 includes a control unit 51.

The control unit 51 is configured to ensure that the difference between the number of times of the positive voltage refresh processes corresponding to the target capsule and the number of times of the negative voltage refresh processes corresponding to the target capsule in the preset time period is less than or equal to the preset difference threshold.

The positive voltage refresh process includes: increasing the amplitude of the control voltage signal to the preset maximum positive voltage value, and then reducing the amplitude of the control voltage signal, so that the target capsule displays the color based on the control voltage signal, so as to complete the refresh of one frame.

The negative voltage refresh process includes: reducing the amplitude of the control voltage signal to the preset maximum negative voltage value, and then increasing the amplitude of the control voltage signal, so that the target capsule displays the color based on the control voltage signal, so as to complete the refresh of one frame.

In some embodiments, the control unit may also perform the specific operations of the method described in the above embodiments, which is not repeated here.

Different from the existing technologies, in the technical solutions of the present disclosure, the difference between the number of times of the positive voltage refresh processes corresponding to the target capsule and the number of times of the negative voltage refresh processes corresponding to the target capsule in the preset time period is less than or equal to the preset difference threshold. Thus, in the preset time period, the number of times of the positive voltage refresh processes corresponding to the target capsule is close to the number of times of the negative voltage refresh processes corresponding to the target capsule. Thus, in the preset time period, the number of times that the amplitude of the control voltage signal received by the target capsule reaches the maximum positive voltage value is close to the number of times that the amplitude of the control voltage signal received by the target capsule reaches the maximum negative voltage value. Thus, it may avoid the situation where the target capsule receives the positive voltage signal or the negative voltage signal for a long time, so as to reduce the possibility of damage to the electronic ink capsule of the electronic ink screen, thereby slowing down the occurrence of the ghosting phenomenon in the electronic ink screen and improving the display effect of the electronic ink screen.

In the description of the present disclosure, the reference terms "an embodiment", "some embodiments", "examples", "specific examples", or "some examples" mean that specific features, structures, materials, or features described in conjunction with the embodiments or examples may be included in at least one embodiment or example of the present disclosure. In the present specification, the illustrative expressions of the above terms do not necessarily refer to the same embodiments or examples. Moreover, the specific features, structures, materials, or characteristics described may be combined in an appropriate manner in any one or more embodiments or examples. In addition, without mutual contradiction, those of skilled in the art may combine the different embodiments or examples, and combine the features of the different embodiments or examples described in the present specification.

In addition, the terms "first" and "second" in the present disclosure are only configured to describe purposes and cannot be understood as indicating or implying relative importance or implicit indicating the quantity of technical features indicated. Therefore, features limited to "first" and "second" may explicitly or implicitly include at least one of these features. In the description of the present disclosure, "multiple" means at least two, such as two, three, etc., unless otherwise expressly and specifically qualified.

Any process or method described in the flowchart or otherwise described herein may be interpreted as representing a module, a segment or a portion of codes including one or more executable instructions for implementing operations of a particular logical function or process. The scope of the preferred embodiment of the present disclosure includes additional implementations in which the functions may be performed in a substantially simultaneous manner according to the functions involved, in an order not shown or discussed or in a reverse order, and shall be understood by the ordinary skilled person in the art.

Logics and/or operations represented in the flowcharts or described herein in another manner, for example, may be considered as a fixed sequence list of executable instructions configured to realize the logic functions and may specifically implemented in any computer-readable medium for an instruction execution system, a device or equipment (such as, a personal computer, a server, a network device, or other system capable of reading instructions from the instruction execution system, the device or the equipment and executing the instructions) to use or for use in combination with the instruction execution system, the device or the equipment. For the specification, "computer-readable medium" may be any device capable of including, storing, communicating with, propagating or transmitting a program for the instruction execution system, the device or the equipment to use or for use in combination with the instruction execution system, the device or the equipment. A more specific example (non-exhaustive list) of the computer-readable medium includes: an electric connection portion (an electronic device) with one or more wires, a portable computer disk (a magnetic device), a random access memory (RAM), a read-only memory (ROM), an erasable programmable ROM (EPROM) (or flash memory), an optical fiber device and a portable compact disc read-only memory (CD-ROM). In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

The above descriptions are only some embodiments of the present disclosure, and are not intended to limit the scope of the present disclosure. Any equivalent structure or equivalent flow transformation made by using the contents of the specification and accompanying drawings of the present disclosure, or directly or indirectly applied to other related technical fields, is included in the scope of the patent protection of the present disclosure.

What is claimed is:

1. A control method for an electronic ink screen, wherein the electronic ink screen comprises a plurality of electronic ink capsules, each of the plurality of the electronic ink capsules comprises first color particles with positive charges and second color particles with negative charges, an amplitude range of a control voltage signal corresponding to the plurality of electronic ink capsules is from a preset maximum negative voltage value to a preset maximum positive voltage value, and one of the plurality of electronic ink capsules is used as a target capsule;

the control method comprises:
ensuring that a difference between the number of times of positive voltage refresh processes corresponding to the target capsule and the number of times of negative voltage refresh processes corresponding to the target capsule in a preset time period is less than or equal to a preset difference threshold;

wherein each of the positive voltage refresh processes comprises: increasing an amplitude of the control voltage signal to the preset maximum positive voltage value, and then reducing the amplitude of the control voltage signal, until the amplitude reaches a target voltage value corresponding to a target color, so that the target capsule is able to display the target color based on the control voltage signal of the target voltage value, completing refresh of one frame corresponding to the target capsule; and the target color is a color that the target capsule needs to display in the current frame; and each of the negative voltage refresh processes comprises: reducing the amplitude of the control voltage signal to the preset maximum negative voltage value, and then increasing the amplitude of the control voltage signal, until the amplitude reaches a target voltage value corresponding to the target color, so that the target capsule is able to display the target color based on the control voltage signal of the target voltage value, completing the refresh of one frame corresponding to the target capsule.

2. The control method as claimed in claim 1, wherein the ensuring that a difference between the number of times of positive voltage refresh processes corresponding to the target capsule and the number of times of negative voltage refresh processes corresponding to the target capsule in a preset time period is less than or equal to a preset difference threshold, comprises:

ensuring that the number of times of the positive voltage refresh processes corresponding to the target capsule is equal to the number of times of the negative voltage refresh processes corresponding to the target capsule in the preset time period.

3. The control method as claimed in claim 1, wherein the preset time period is a time period corresponding to two frames, and one frame of the two frames is defined as a first frame and the other frame of the two frames is defined as a second frame;

the ensuring that a difference between the number of times of positive voltage refresh processes corresponding to the target capsule and the number of times of negative voltage refresh processes corresponding to the target capsule in a preset time period is less than or equal to a preset difference threshold, comprises:

in a time period corresponding to the first frame, increasing the amplitude of the control voltage signal to the preset maximum positive voltage value, and then reducing the amplitude of the control voltage signal, so that the target capsule displays the color based on the control voltage signal to complete the refresh of the first frame; and in a time period corresponding to the second frame, reducing the amplitude of the control voltage signal to the preset maximum negative voltage value, and then increasing the amplitude of the control voltage signal, so that the target capsule displays the color based on the control voltage signal to complete the refresh of the second frame; or in the time period corresponding to the first frame, reducing the amplitude of the control voltage signal to the preset maximum negative voltage value, and then increasing the amplitude of the control voltage signal, so that the target capsule displays the color based on the control voltage signal to complete the refresh of the first frame; and in the time period corresponding to the second frame, increasing the amplitude of the control voltage signal to the preset maximum positive voltage value, and then reducing the amplitude of the control voltage signal, so that the target capsule displays the color based on the control voltage signal to complete the refresh of the second frame.

4. The control method as claimed in claim 1, wherein the preset time period comprises a first time period and a second time period, and a difference between a duration of the first time period and a duration of the second time period is less than or equal to a preset time difference threshold;

the ensuring that a difference between the number of times of positive voltage refresh processes corresponding to the target capsule and the number of times of negative voltage refresh processes corresponding to the target capsule in a preset time period is less than or equal to a preset difference threshold, comprises:

controlling the target capsule to display the color of each frame based on the positive voltage refresh process in the first time period, and controlling the target capsule to display the color of each frame based on the negative voltage refresh process in the second time period.

5. The control method as claimed in claim 4, wherein the number of frames in the first time period is equal to the number of frames in the second time period, and the number of frames in the first time period or the number of frames in the second time period is greater than one.

6. The control method as claimed in claim 4, wherein a duration of a time period corresponding to each frame in the preset time period is the same.

7. The control method as claimed in claim 1, wherein the preset time period comprises a first time period and a second time period, the number of frames in a time period corresponding to the first time period is equal to the number of frames in a time period corresponding to the second time period, and the time period corresponding to the first time period is in the time period corresponding to the second time period;

the ensuring that a difference between the number of times of positive voltage refresh processes corresponding to the target capsule and the number of times of negative voltage refresh processes corresponding to the target capsule in a preset time period is less than or equal to a preset difference threshold, comprises:

determining the number of times that the positive voltage refresh process needs to be executed in the second time period based on the number of times that the negative voltage refresh process is executed in the first time period, and recording the number of times that the positive voltage refresh process needs to be executed in the second time period as a positive voltage number of times; and determining the number of times that the negative voltage refresh process needs to be executed in the second time period based on the number of times that the positive voltage refresh process is executed in the first time period, and recording the number of times that the negative voltage refresh process needs to be executed in the second time period as a negative voltage number of times; and executing the positive voltage refresh process of the positive voltage number of times and executing the negative voltage refresh process of the negative voltage number of times in the second time period.

8. The control method as claimed in claim 7, wherein the ensuring that a difference between the number of times of positive voltage refresh processes corresponding to the target capsule and the number of times of negative voltage refresh processes corresponding to the target capsule in a preset time period is less than or equal to a preset difference threshold, further comprises:

in the first time period, determining a value closest to the current amplitude of the control voltage signal in the preset maximum negative voltage value and the preset maximum positive voltage value in response to the target capsule displaying the color based on the control voltage signal to complete the refresh of one frame, wherein the negative voltage refresh process is executed in response to the closest value being the preset maximum negative voltage value, and the positive voltage refresh process is executed in response to the closest value being the preset maximum positive voltage value, so as to complete the refresh of a next frame.

9. The control method as claimed in claim 8, wherein in the second time period, executing the positive voltage refresh process of the positive voltage number of times, and executing the negative voltage refresh process of the negative voltage number of times, comprises:

in the second time period, determining a value closest to the current amplitude of the control voltage signal in the preset maximum negative voltage value and the preset maximum positive voltage value in response to the target capsule displaying the color based on the control voltage signal to complete the refresh of one frame, wherein the negative voltage refresh process is executed in response to the closest value being the preset maximum negative voltage value, and the positive voltage refresh process is executed in response to the closest value being the preset maximum positive voltage value, so as to complete the refresh of the next frame, until the number of times that the positive voltage refresh process is executed reaches the positive voltage number of times in the second time period, or the number of times that the negative voltage refresh process is executed reaches the negative voltage number of times in the second time period.

10. The control method as claimed in claim 9, wherein in the second time period, executing the positive voltage refresh process of the positive voltage number of times, and executing the negative voltage refresh process of the negative voltage number of times, further comprises:
controlling the target capsule to complete refresh of each frame that has not been refreshed in the second time period based on the negative voltage refresh process in response to the number of times that the positive voltage refresh process in the second time period is executed reaching the positive voltage number of times, and controlling the target capsule to complete the refresh of each frame that has not been refreshed in the second time period based on the positive voltage refresh process in response to the number of times that the negative voltage refresh process is executed in the second time period reaching the negative voltage number of times.

11. The control method as claimed in claim 1, wherein the first color particles are white particles, and the second color particles are black particles; or the first color particles are black particles, and the second color particles are white particles.

12. The control method as claimed in claim 1, wherein a ratio of the preset difference threshold to the number of times of the positive voltage refresh processes in the preset time period is recorded as a first ratio, and/or a ratio of the preset difference threshold to the number of times of the negative voltage refresh processes in the preset time period is recorded as a second ratio; and
the first ratio is less than or equal to a preset ratio threshold, and/or, the second ratio is less than or equal to the preset ratio threshold.

13. The control method as claimed in claim 1, wherein a duration of the preset time period is less than or equal to a duration corresponding to preset quantity of frames.

14. The control method as claimed in claim 13, wherein preset quantity is negatively correlated with a usage duration of the target capsule.

15. The control method as claimed in claim 13, wherein a usage duration of a capsule with the longest usage duration in the plurality of electronic ink capsules is recorded as a target usage duration; and
the preset quantity is negatively correlated with the target usage duration.

16. A control device for an electronic ink screen, wherein the electronic ink screen comprises a plurality of electronic ink capsules, each of the plurality of the electronic ink capsules comprises first color particles with positive charges and second color particles with negative charges, an amplitude range of a control voltage signal corresponding to the plurality of electronic ink capsules is from a preset maximum negative voltage value to a preset maximum positive voltage value, and one of the plurality of electronic ink capsules is used as a target capsule;
the control device comprises:
a control unit, configured to ensure that a difference between the number of times of positive voltage refresh processes corresponding to the target capsule and the number of times of negative voltage refresh processes corresponding to the target capsule in a preset time period is less than or equal to a preset difference threshold;
wherein each of the positive voltage refresh processes comprises: increasing an amplitude of the control voltage signal to the preset maximum positive voltage value, and then reducing the amplitude of the control voltage signal, until the amplitude reaches a target voltage value corresponding to a target color, so that the target capsule is able to display the target color based on the control voltage signal of the target voltage value, completing refresh of one frame corresponding to the target capsule; and the target color is a color that the target capsule needs to display in the current frame; and
each of the negative voltage refresh processes comprises: reducing the amplitude of the control voltage signal to the preset maximum negative voltage value, and then increasing the amplitude of the control voltage signal, until the amplitude reaches a target voltage value corresponding to the target color, so that the target capsule is able to display the target color based on the control voltage signal of the target voltage value, completing the refresh of one frame corresponding to the target capsule.

17. The control device as claimed in claim 16, wherein the control unit is configured for:
ensuring that the number of times of the positive voltage refresh processes corresponding to the target capsule is equal to the number of times of the negative voltage refresh processes corresponding to the target capsule in the preset time period.

18. The control device as claimed in claim 16, wherein the preset time period is a time period corresponding to two frames, and one frame of the two frames is defined as a first frame and the other frame of the two frames is defined as a second frame; and
the control unit is configured for:
in a time period corresponding to the first frame, increasing the amplitude of the control voltage signal to the preset maximum positive voltage value, and then reducing the amplitude of the control voltage signal, so that the target capsule displays the color based on the control voltage signal to complete the refresh of the first frame; and in a time period corresponding to the second frame, reducing the amplitude of the control voltage signal to the preset maximum negative voltage value, and then increasing the amplitude of the control voltage signal, so that the target capsule displays the color based on the control voltage signal to complete the refresh of the second frame; or
in the time period corresponding to the first frame, reducing the amplitude of the control voltage signal to the preset maximum negative voltage value, and then increasing the amplitude of the control voltage signal, so that the target capsule displays the color based on the control voltage signal to complete the refresh of the first frame; and in the time period corresponding to the second frame, increasing the amplitude of the control voltage signal to the preset maximum positive voltage value, and then reducing the amplitude of the control voltage signal, so that the target capsule displays the color based on the control voltage signal to complete the refresh of the second frame.

19. The control device as claimed in claim 16, wherein the preset time period comprises a first time period and a second time period, and a difference between a duration of the first time period and a duration of the second time period is less than or equal to a preset time difference threshold; and
the control unit is configured for:
controlling the target capsule to display the color of each frame based on the positive voltage refresh process in the first time period, and
controlling the target capsule to display the color of each frame based on the negative voltage refresh process in the second time period.

20. An electronic ink screen, comprising:
a plurality of electronic ink capsules; wherein each of the plurality of electronic ink capsules comprises first color particles with positive charges and second color particles with negative charges, an amplitude range of a control voltage signal corresponding to the plurality of electronic ink capsules is from a preset maximum negative voltage value to a preset maximum positive voltage value, and one of the plurality of electronic ink capsules is used as a target capsule;
a memory, configured to store a program instruction; and
a processor, configured to execute the program instruction to implement a control method for an electronic ink screen, wherein the control method comprises:
ensuring that a difference between the number of times of positive voltage refresh processes corresponding to the target capsule and the number of times of negative voltage refresh processes corresponding to the target capsule in a preset time period is less than or equal to a preset difference threshold;
wherein each of the positive voltage refresh processes comprises: increasing an amplitude of the control voltage signal to the preset maximum positive voltage value, and then reducing the amplitude of the control voltage signal, until the amplitude reaches a target voltage value corresponding to a target color, so that the target capsule is able to display the target color based on the control voltage signal of the target voltage value, completing refresh of one frame corresponding to the target capsule; and the target color is a color that the target capsule needs to display in the current frame; and
each of the negative voltage refresh processes comprises: reducing the amplitude of the control voltage signal to the preset maximum negative voltage value, and then increasing the amplitude of the control voltage signal, until the amplitude reaches a target voltage value corresponding to the target color, so that the target capsule is able to display the target color based on the control voltage signal of the target voltage value, completing the refresh of one frame corresponding to the target capsule.

* * * * *